3,049,472
METHOD AND COMPOSITION FOR THE TREATMENT OF SOIL

Arthur W. Swezey, Garden Grove, Calif., assignor to The Dow Chemical Company, Midland, Mich., a corporation of Delaware
No Drawing. Filed Oct. 7, 1953, Ser. No. 384,789
9 Claims. (Cl. 167—39)

The present invention is concerned with the treatment of soil or growth media and is particularly directed to a method and composition for the control of soil inhabiting invertebrates which attack the underground parts of plants and improving the growth characteristics of plants.

It is an object of the present invention to provide an improved method for the fumigation and disinfection of soil infested with nematodes and other invertebrates which attack plant roots. An additional object is to provide a method for improving the growth characteristics of plants. A further object is to provide a novel soil composition. Another object is the provision of a novel composition adapted to be employed in the new method of fumigation. Other objects will become apparent from the following specification and claims.

According to the present invention it has been discovered that soil inhabiting invertebrates which attack the underground parts of plants may be controlled by fumigating soil or other growth media with a parasiticidal amount of 1,2-dibromo-3-chloropropane. Further, the growth characteristics of many plants are improved when the soil is treated with 1,2-dibromo-3-chloropropane prior to seeding or planting. The propane compound is a relatively colorless, non-flammable, viscous liquid boiling at about 200° C. at atmospheric pressure. The compound is somewhat soluble in many organic solvents and substantially insoluble in water, and is adapted to be conveniently and readily distributed in soil. Further, the 1,2-dibromo-3-chloropropane compound, when distributed through soil, accomplishes a rapid control of soil dwelling nematodes. The compound is conveniently injected into the soil and permeates growth media for a distance of several inches from the point of application depending upon temperature, moisture content, compactness and physical consistency of the mixture. Further, the compound is sufficiently persistent to accomplish the desired effect upon the soil-dwelling-organisms or to achieve the changes in the soil which accomplish improved growth characteristics but dissipates in a reasonable period of time.

The expression "soil" is employed in its broadest sense to be inclusive of all conventional "soils," as defined in Webster's New International Dictionary, second edition, unabridged, published in 1937 by G. and C. Merriam Company, Springfield, Massachusetts. Thus, the term refers to any substance or medium in which vegetative organisms may take root and grow, and is intended to include not only earth, but also compost, manure, muck, sand and the like, adapted to support plant growth.

The distribution of a minimum effective dosage of the 1,2-dibromo-3-chloropropane in soil is essential for the practice of the invention. Where nematodes are to be controlled, this amounts to a parasiticidal concentration. Where plant growth response is concerned, these same concentrations are operable. In general, good results are obtained when the propane compound is distributed through the soil in the amount of from 3 to 200 parts or more by weight per million parts by weight of the soil. In field applications, the 1,2-dibromo-3-chloropropane compound may be distributed in the soil at a dosage of from about 6 to 600 pounds or more per acre, and through such a cross-section of the soil as to provide for the presence therein of the indicated concentrations of the toxic agent. In such applications, it is desirable that the compound be distributed to a depth of at least 2 inches. When the treatment is carried out by injection or drilling technique it is preferred that the maximum distance between deposits be not in excess of from about 8 to about 15 inches. In the row treatment of existing vegetation the product may be employed in accordance with known suitable side-dressing techniques.

The method of the present invention may be carried out by impregnating or otherwise fumigating the soil or growth media with the unmodified propane compound. However, the present method also embraces the employment of a liquid or dust composition containing the toxicant. In such usage, the propane compound may be modified with one or a plurality of additaments including solvents or other liquid carriers, dispersing and emulsifying agents and finely divided inert solids. Depending upon the concentration of toxicant, such augmented compositions are adapted to be distributed in the soil, or employed as concentrates and subsequently diluted with additional inert carrier to produce the ultimate treating compositions. The required amount of 1,2-dibromo-3-chloropropane in the soil may conveniently be supplied per acre treated, in from 10 to 162,000 gallons or more of the liquid carrier or in from about 50 to 1000 pounds of the solid carrier.

The exact concentration of 1,2-dibromo-3-chloropropane to be employed in compositions for the treatment of soil is not critical. The concentration of toxicant in liquid compositions employed to supply the desired dosage generally is from about 0.01 to 50 percent by weight or higher. In dusts, the concentration of toxicant may be from about 6 to 20 percent by weight. In compositions to be employed as concentrates, the toxicant may be present in a concentration of from about 10 to 95 percent by weight.

Liquid compositions containing the desired amount of 1,2-dibromo-3-chloropropane may be prepared by dissolving the toxicant in an organic liquid such as acetone, methylene chloride, chlorobenzene and petroleum distillates, or by dispersing the toxicant in water with the aid of a suitable dispersing and emulsifying agent. The preferred organic solvent carriers are those which are adapted to accomplish the penetration and impregnation of the soil with the propane compound and are of such volatility that they evaporate from the soil and leave little permanent residue therein.

The aqueous compositions to be employed in the present method may contain one or more water-immiscible solvents for the propane compound. In such compositions, the carrier comprises an aqueous emulsion, i.e. a mixture of water-immiscible solvent, emulsifying agent and water. The choice of dispersing and emulsifying agent and the amount thereof employed is dictated by the nature of the composition type and by the ability of the agent to facilitate the dispersion of the propane compound in the aqueous carrier to produce the desired fumigant composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

A preferred embodiment of the invention consists of a petroleum distillate solution of 1,2-dibromo-3-chloropropane. The petroleum distillates to be employed in such embodiment are carefully cut portions boiling almost entirely under 400° F. at atmospheric pressure and having a flash point above about 80° F. These fumigant compositions are characterized by having excellent penetrating properties and by being of low fire hazard to the shipper and user.

In the preparation of dust compositions, the dibromochloropropane compound is dispersed in and on a finely divided material such as pyrophyllite, attapulgite, chalk, talc, fuller's earth or bentonite. In such operation, the finely divided carrier is mixed or wet with the propane compound or a volatile organic solvent solution thereof.

A further preferred embodiment of the present invention is a novel composition comprising soil in admixture with an effective concentration of 1,2-dibromo-3-chloropropane.

When operating in accordance with the present invention, the soil or growth media may be impregnated with the propane compound or a composition containing the toxicant, in any convenient fashion, e.g. by simple mixing with the growth media, by employing a liquid carrier to accomplish the penetration and impregnation, or by injection or drilling techniques whereby the toxicant is deposited beneath the surface of the soil. In general, it is desirable that such distribution be carried out at a soil temperature of 45° F. or higher since the effectiveness of the propane compound may be somewhat reduced at lower temperatures. In an alternative method, the distribution may be accomplished by introducing the toxicant in the water employed to irrigate the soil. In this method, the amount of water may be varied in accordance with the porosity and water holding capacity of the soil in order to obtain the desired depth of distribution of the toxicant. Following the distribution of the propane compound, it is preferred that the planting operation not be carried out for a period of at least several days. When following such a practice, no adverse effect upon germination of seeds or growth of the transplants is observed. Further, where minimium dosages are employed as, for example, in side-dressing operations, existing mature vegetation of species resistant to the 1,2-dibromo-3-chloropropane are not unfavorably affected by the concentrations of the treating composition temporarily present in the soil.

The following examples illustrate the invention but are not to be construed as limiting the same:

Example 1

1,2-dibromo-3-chloropropane was dissolved in acetone to produce a fumigant composition containing 500 grams of the propane compound per liter of the ultimate mixture. This composition was employed for the treatment of a seed bed containing a sandy loam soil which was heavily infested with root knot nematodes. At the time of treatment the soil had a moisture content of about 10 percent. The distribution was accomplished by injecting the fumigant solution into the soil in rows 12 inches apart, the injections being made at 4 inch intervals and at a depth of about 6 inches below the soil surface. The amount of fumigant material employed was sufficient to supply 50 pounds of 1,2-dibromo-3-chloropropane per acre. Following the application, the average soil temperature remained at about 62° F. for the period of the determination.

Ten days after treatment, the soil was seeded with tomato plants, the seeded soil being that positioned approximately 6 inches from the loci of treatment. Untreated check plots were also planted with tomato seeds. During the growing period, there was observed no adverse effect upon the germination and growth of seedlings attributable to the presence of residual fumigant. About 5 weeks after seeding, the plants were lifted from the soil, the roots washed and the latter examined for gall formation attributable to nematode attack. The examination of the plants indicated a 99 percent control of nematodes in the treated soil, with heavy infestation in the check plots.

Example 2

1,2-dibromo-3-chloropropane is employed for the treatment of a seed bed containing a sandy loam soil which is heavily infested with root knot nematodes. The distribution is accomplished by injecting the propane compound into the soil in the manner as described in Example 1. The treatment is carried out at a substantially uniform dosage of 80 pounds per acre. Following the application, the average soil temperature remains at about 62° F. for the period of the determination.

Fourteen days after treatment, the soil is seeded with tomato plants, the seeded soil being that positioned approximately six inches from the loci of treatment. Untreated checks are also planted with tomato seeds. During the growing period, there is observed no adverse effect upon the germination and growth of seedlings attributable to the presence of residual fumigant. About six weeks after seeding, the plants are lifted from the soil, the roots washed and the latter examined for gall formation attributable to nematode attack. The examination shows a commercial control of nematodes in the treated soil with the roots of the plants from the untreated soil being dwarfed and severely affected with galls attributable to nematode attack.

Example 3

An acetone solution containing 50 grams of 1,2-dibromo-3-chloropropane per liter of solution was employed for the treatment of a sandy loam soil which was heavily infested with root knot nematodes. In such operations, the soil was placed in a sealable container and thereafter treated with the fumigant composition at a dosage of 50 pounds per acre-foot. In the treating operation, the distribution was accomplished by injection to give a concentration of about 12 parts by weight of the propane compound per million parts by weight of soil. The containers of treated soil were then sealed and set aside for about one week.

Following the latter period, the containers were unsealed, and the treated soil allowed to aerate for about one week and thereafter planted with tomato seeds. Untreated check plots were also planted with tomato seeds. During the following growth period there was observed no adverse effect upon germination and growth of seedlings attributable to the presence of residual fumigation. About 5 weeks after planting, the plants were lifted from the soil, and the roots washed and examined for evidence of nematode attack. The examination of the plants indicated that a 100 percent control of nematodes had been obtained in the treated soil, with heavy infestation in the check plots.

Example 4

1,2-dibromo-3-chloropane is dissolved in a petroleum hydrocarbon fraction boiling at from about 240° F. to 365° F. (standard thinner No. 300) to produce a fumigant composition containing about 500 grams of the propane compound per liter of ultimate mixture. This composition is employed for the treatment of a sandy loam soil heavily infested with root-knot nematodes. In the treating operations, the toxicant mixture is injected into soil areas at dosages of 0.5 and 0.25 milliliter per 11 pounds of soil to provide concentrations of about 50 and 25 parts by weight, respectively, of the propane compound per million parts by weight of soil. At the time of treatment the soil has a moisture content of about 10 percent. Following the distribution, the average soil temperature is maintained at about 68° F. for the period of the determination.

About two weeks after treatment, two week old tomato plants grown on nematode-free soil are transplanted to the treated soil areas. Untreated checks are also planted with the two week old plants. About six weeks after the transplanting, the plants are carefully lifted from the soil, the roots washed and the latter examined for gall formation attributable to nematode attack. The examination shows a 100 percent control of nematodes in the soil treated with 1,2-dibromo-3-chloropropane. In contrast, the roots of the plants from the check beds are severely affected with galls attributable to nematode attack.

*Example 5*

In a similar manner, nematode infested seed beds of sandy loam soil are separately injected with 1,2-dibromo-3-chloropropane at dosages of 0.5 and 0.25 milliliter per 11 pounds of soil to provide concentrations of about 210 and 105 parts by weight, respectively, of toxicant per million parts by weight of soil. At the time of treatment the soil has a moisture content of about 10 percent. About two weeks after the distribution, the treated seed beds and untreated but nematode infested seed beds are planted with two week old tomato plants grown on nematode-free soil. About six weeks after transplanting, the plants are lifted from the soil, the roots washed and the latter examined for gall formation attributable to nematode attack. The examination shows a 100 percent control of root-knot nematodes in the treated soil areas with heavy infestation in the check beds.

*Example 6*

1,2-dibromo-3-chloropropane was dissolved in a petroleum hydrocarbon fraction boiling at from 190° to 272° F. (standard thinner No. 250) to produce a fumigant composition containing 85 grams of the propane compound per liter of the ultimate mixture. This composition was employed for the treatment of a nematode infested seed bed having a moisture content of about 5 percent. In these operations, the toxicant mixture was injected into the soil in an amount sufficient to supply 50 and 150 pounds of 1,2-dibromo-3-chloropropane per acre-foot. The latter dosages correspond to concentrations of about 12 and 36 parts by weight, respectively, of the propane compound per million parts by weight of soil. Following the application, the average soil temperature remained at about 62° F. Each treatment was replicated five times.

Eight days after treatment, samples of soil from the treated plots and from untreated check plots were examined microscopically and counts of nematodes made in order to determine the percentage control of this organism. The examination indicated that a 78 and 91 percent control of nematodes had been obtained in the soil treated at dosages of 50 and 150 pounds per acre, respectively.

*Example 7*

45 parts by weight of 1,2-dibromo-3-chloropropane, 80 parts by weight of chlorobenzene and 5 parts of a dimeric alkylated aryl polyether acohol (Triton X–155) are mechanically mixed together to prepare a fumigant composition in the form of an emulsifiable liquid. In a similar manner, 90 parts by weight of 1,2-dibromo-3-chloropropane and 10 parts by weight of Triton X–155 are mixed together to prepare a concentrate composition in the form of a water-dispersible liquid. These compositions are adapted to be dispersed in water to prepare aqueous fumigant compositions which have very desirable wetting and penetrating properties. The latter aqueous compositions may be employed to fumigate soil and distribute 1,2-dibromo-3-chloropropane therein in parasiticidal concentrations.

*Example 8*

90 parts by weight of 1,2-dibromo-3-chloropropane is intimately mixed with 12 parts by weight of Triton X-155 and the resulting composition thereafter dispersed in water to prepare a composition containing about 100 pounds of 1,2-dibromo-3-chloropropane per 200 gallons of ultimate mixture. The latter composition, while under agitation is metered into irrigation water at the pump outlet at the rate of 2 gallons per 1000 gallons of the irrigation water. The water is in a state of turbulent flow as it comes from the pump which provides for thorough mixing of the toxicant therein. About 3 inches of the irrigation water are applied to land, which is heavily infested with root-knot nematodes to accomplish the wetting of the soil to about an 18 inch depth. A few weeks after the treatment the soil is planted with tomato seeds. Eight weeks after the seeding, the resulting stand of tomato plants is examined and found substantially free of nematode attack.

*Example 9*

A fumigant composition, having a flash point greater than 100° F., is prepared by mixing together 20 percent by volume of 1,2-dibromo-3-chloropropane and 80 percent of a petroleum fraction commonly known as Stoddard solvent. The latter solvent has a boiling range of from 325° to 400° F. and a flash point of about 116° F. This fumigant composition is employed for the treatment of one-half of a field containing a sandy loam soil. The treatment is carried out by drilling technique whereby the fumigant mixture is introduced at a depth of about 6 inches and in rows spaced about 8 inches apart. The amount of fumigant composition employed is sufficient to supply about 25 pounds of 1,2-dibromo-3-chloropropane per acre.

Ten days after treatment, the entire field is seeded to carrots. During the growing period there is observed no adverse effect upon the germination and growth of the crop attributable to the presence of residual fumigant. Toward the end of the growing season, the foliage and tops of the carrot plants in the treated portion of the field are observed to be more lush and bountiful than those in the untreated part. At harvest, the yield of carrots taken from the treated soil is found substantially greater than that from the untreated soil by a factor of several percent. This improved growth response is attributable to the propane compound, since examination of the harvested plants taken from the treated and untreated soil shows no evidence of substantial injury due to invertebrate pests.

1,2-dibromo-3-chloropropane as employed in accordance with the present invention may be prepared by the direct bromination of allyl chloride. The reaction is somewhat exothermic and takes place readily at temperatures of from 20° to 60° C. In carrying out the reaction, the bromine is added portionwise to the allyl chloride with stirring and with cooling, if required. Following the reaction the desired product may be separated by fractional distillation under reduced pressure.

I claim:

1. A method for the control of soil dwelling nematodes which comprises fumigating soil with a nematocidal amount of 1,2-dibromo-3-chloropropane as a nematocidal toxicant.

2. A method for the control of soil dwelling nematodes which comprises impregnating soil infested with said organism with 1,2-dibromo-3-chloropropane as a nematocidal toxicant in the amount of at least 3 parts by weight per million parts by weight of soil.

3. A method for the control of soil dwelling nematodes which comprises impregnating field soil infested with said organism with 1,2-dibromo-3-chloropropane as a nematocidal toxicant at a substantially uniform dosage of at least 6 pounds per acre, the impregnation being carried out through such a cross-section of the soil as to provide for the presence therein of a concentration of the propane compound of at least 3 parts by weight per million parts by weight of soil.

4. A method according to claim 3 wherein the soil is impregnated with a composition comprising a petroleum distillate solution of 1,2-dibromo-3-chloropropane.

5. A composition for the control of soil dwelling nematodes comprising 1,2-dibromo-3-chloropropane as an active toxic ingredient in intimate association with an inert finely divided carrier, the 1,2-dibromo-3-chloropropane being present in the amount of from 6 to 20 percent by weight.

6. A composition for the control of soil dwelling nematodes comprising 1,2-dibromo-3-chloropropane as an active toxic ingredient in intimate association with an aqueous emulsion, the 1,2-dibromo-3-chloropropane being present in the amount of at least 0.01 percent by weight.

7. A concentrate composition for the control of soil dwelling nematodes comprising 1,2-dibromo-3-chloropropane as a nematocidal toxicant in intimate association with an emulsifying and dispersing agent, the 1,2-dibromo-3-chloropropane being present in the amount of from 10 to 95 percent by weight.

8. A method according to claim 2 wherein the soil is impregnated with a composition comprising 1,2-dibromo-3-chloropropane as a nematocidal toxicant in intimate admixture with an inert soil fumigating adjuvant as a carrier therefor.

9. A composition for the control of soil dwelling nematodes comprising 1,2-dibromo-3-chloropropane as a nematocidal toxicant in intimate admixture with a petroleum distillate boiling under 400° F. and having a flash point above 80° F., the 1,2-dibromo-3-chloropropane being present in the amount of from 10 to 95 percent by weight.

References Cited in the file of this patent

UNITED STATES PATENTS

| | | |
|---|---|---|
| 2,415,251 | Leavitt | Feb. 4, 1947 |
| 2,421,507 | Jones | June 3, 1947 |
| 2,586,793 | Doty | Feb. 26, 1952 |
| 2,596,929 | Kagy | May 13, 1952 |

FOREIGN PATENTS

| | | |
|---|---|---|
| 920,161 | France | Jan. 2, 1947 |

OTHER REFERENCES

Jurinak: Agricultural and Food Chemistry, vol. 5, No. 8, August 1957, pp. 598 to 601 (footnote on p. 601 referring to a 1952 publ. is especially pertinent).

Frear: "Chemistry of Insecticides, Fungicides and Herbicides," 2nd edition, 1948, pp. 287–288.

Frear: "Catalogue of Insecticides and Fungicides," vol. 1, 1947, pp. 160–161.

Bolock: "Journal of Economic Entomology," vol. 44, No. 5, October 1951, pp. 657–659.

King: U.S. Dept. of Agric. Handbook, No. 69, May 1954, p. 278.